US006823096B2

United States Patent
Dragone

(10) Patent No.: US 6,823,096 B2
(45) Date of Patent: Nov. 23, 2004

(54) BROADBAND OPTICAL SWITCHING ARRANGEMENTS WITH VERY LOW CROSSTALK

(75) Inventor: Corrado P. Dragone, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 637 days.

(21) Appl. No.: 09/755,243

(22) Filed: Jan. 5, 2001

(65) Prior Publication Data

US 2004/0179769 A1 Sep. 16, 2004

(51) Int. Cl.[7] .................................................. G02B 6/26

(52) U.S. Cl. .............................. 385/16; 385/24; 385/31; 385/46; 385/48

(58) Field of Search .............................. 385/16, 17, 24, 385/27, 31, 39, 46, 48

(56) References Cited

U.S. PATENT DOCUMENTS

| 5,039,993 | A | | 8/1991 | Dragone |
| 5,136,671 | A | | 8/1992 | Dragone |
| 5,212,758 | A | | 5/1993 | Adar et al. |
| 6,049,640 | A | * | 4/2000 | Doerr .......................... 385/15 |
| 6,058,233 | A | | 5/2000 | Dragone |

* cited by examiner

*Primary Examiner*—Juliana K. Kang

(57) ABSTRACT

A switching apparatus provides 1×2 and 2×2 switching functions having significantly reduced crosstalk levels using an imaging arrangement of three arms combined with two star couplers. In another 1×2 switching element embodiment, the input star coupler is replaced with an optical signal splitter. Application of the 1×2 and 2×2 switching elements include the realization of a variety of dilated N×N broadband switches with negligible crosstalk over very wide wavelength stopband characterized by two or more equally spaced zeros. The very wide crosstalk stopband enables the N×N broadband switch to switch a broadband wavelength division multiplexed input signal to the desired output port with very low crosstalk at the other output ports.

27 Claims, 11 Drawing Sheets

$R_1 = 30$ nm $a = 5$ μm $R = 90$ μm $\lambda_0 \simeq 1$ μm $n_0 = 1.445$ (GLASS)

$\Delta n \simeq 0.65\%$

BROADBAND OPTICAL SWITCHING ARRANGEMENTS WITH VERY LOW CROSSTALK

TECHNICAL FIELD OF THE INVENTION

The present invention generally relates to optical switching and, more particularly, to techniques for implementing broadband optical switching arrangements having very low crosstalk.

BACKGROUND OF THE INVENTION

There is a need to minimize the crosstalk in large N×N optical space switches realized using 1×2 or 2×2 switching elements. When N is large, the total crosstalk contribution from the various elements becomes correspondingly large. Typically, the crosstalk performance of an 2×2 element realized using conventional techniques is unsatisfactory in several respects. Ideally one would like crosstalk to be negligible over a wide wavelength range. Instead, for a conventional Mach-Zehnder arrangement, negligible crosstalk over a wide wavelength range is only possible when the element is in the cross state (the input signals are interchanged, i.e., input 1 goes to output 2, etc.). For the bar state (the input signals are not interchanged, i.e., input 1 goes to output 1, etc.) negligible crosstalk is only possible in the vicinity of a particular design wavelength $\lambda_0$. Moreover, for the bar state, zero crosstalk transmission at $\lambda_0$ strictly requires precise control of the coupling coefficients of the input and output couplers connected to the arms of the Mach-Zehnder. This condition is difficult to realize in practice, because of fabrication errors. Thus the coupling coefficients typically deviate appreciable from the specified values, and appreciable crosstalk is produced in the bar state.

Thus, there is a continuing need to minimize crosstalk in large N×N space switches, implemented using 1×2 and 2×2 switching elements, over a wide range of optical wavelengths.

SUMMARY OF THE INVENTION

In accordance with the switching apparatus and operating method of the present invention, I have significantly reduced crosstalk by designing 1×2 and 2×2 switching elements using an imaging arrangement of three arms combined with two star couplers. In one embodiment of a 1×2 switching element, the input star coupler is replaced with an optical signal splitter. Application of the 1×2 and 2×2 switching elements of the present invention include the realization of a dilated N×N broadband switch with negligible crosstalk over a very wide wavelength stopband characterized by at least two equally spaced zeros. The very wide crosstalk stopband enables the N×N broadband switch to switch a broadband wavelength division multiplexed input signal to one particular output port with very low crosstalk at the other output ports.

More particularly, in accordance with the present invention, my optical switching apparatus comprises
- an imaging arrangement including a first and second couplers having three imaging waveguide arms connected therebetween;
- the first coupler including at least one input connected as an input waveguide of the switching apparatus and three outputs connected to the three imaging arms;
- the second coupler is a star coupler consisting of a first and second radial array separated by a slab waveguide, the three imaging arms being connected to three central waveguides of the first radial array, and two central waveguides of the second radial array being connected to two output waveguides of the switching apparatus;
- the three imaging arms including a top, a central, and a bottom imaging arm;
- at least two of the three imaging arms including wavelength adjusters to control optical path lengths through the three arms, said adjusters adjusted to produce equal optical path lengths from the input waveguide to a first output waveguide thereby maximizing power transfer from the input waveguide to the first output waveguide; and
- the spacing between the two central waveguides of the second radial array being selected so as to minimize power transfer to the second waveguide; and
- wherein the difference between the combined power transferred to the top and bottom imaging arm and the power transferred to the central imaging arm is within a predetermined value.

My operating method is applied to an optical switching apparatus comprising
- an imaging arrangement including a first and second couplers having three imaging waveguide arms connected therebetween;
- the first coupler including at least one input connected as an input waveguide of the switching apparatus and three outputs connected to the three imaging arms;
- the second coupler is a star coupler consisting of a first and second radial array separated by a slab waveguide, the three imaging arms being connected to three central waveguides of the first radial array, and two central waveguides of the second radial array being connected to two output waveguides of the switching apparatus; and
- the three imaging arms including a top, a central, and a bottom imaging arm;

my method comprises the steps of:
- adjusting the phase of a optical signal in at least two of the three imaging arms to produce equal optical signal phase delay from the input waveguide to a output waveguide thereby maximizing power transfer from the input waveguide to the first output waveguide; and
- wherein the difference between the combined power transferred to the top and bottom imaging arm and the power transferred to the central imaging arm is within a predetermined maximum value.

BRIEF DESCRIPTION OF THE DRAWINGS

In the drawings.

In the following description, identical element designations in different figures represent identical elements. Additionally in the element designations, the first digit refers to the figure in which that element is first located (e.g., 102 is first located in FIG. 1).

DETAILED DESCRIPTION

Figure 1:
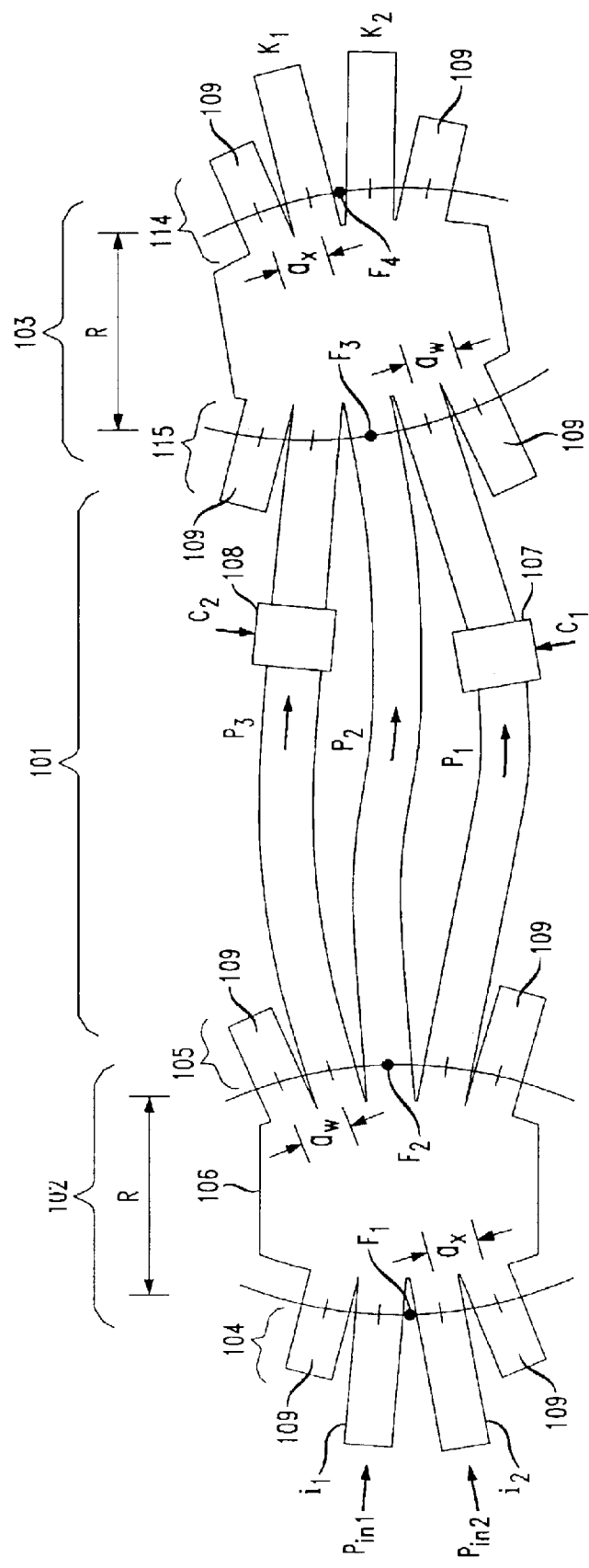
FIG. 1 shows a block diagram of my switching apparatus implemented as a 2×2 imaging arrangement of three arms combined with two star couplers. The 2×2 imaging arrangement may be used as a 1×2 or 2×2 switching element.

As shown in FIG. 1 and in accordance with the present invention, my switching apparatus significantly reduces crosstalk by using 1×2 and 2×2 switching elements having an imaging arrangement of three arms 101 combined with an input 102 and output 103 star couplers. Each coupler, e.g. 102, is realized as described in [1,2] (refers to references listed in the attached Appendix) using a confocal arrangement of two arrays 104, 105 separated by planar free-space region 106 formed by a slab and, therefore, the various coupling coefficients do not depend critically on the fabrication accuracy. Moreover, since three arms 101 are used, the crosstalk transfer function from a particular input waveguide i1, i2 to a particular output waveguide k1, k2 is essentially characterized by a double zero in the crosstalk power characteristic (401,402 of FIG. 4). As a result, very low levels of crosstalk are realized at output waveguides k1, k2 over a wide range of input signal wavelengths transmitted from input waveguides i1, i2. Application of the 1×2 and 2×2 switching elements of the present invention includes the realization of a dilated N×N broadband switch (FIGS. 7A–7C) with negligible crosstalk over very wide wavelength stopband characterized by 4 equally spaced zeros. The very wide crosstalk stopband enables the N×N broadband switch to switch an input broadband wavelength division multiplexed signal to one output port with very low crosstalk at the other output ports.

Figure 2:
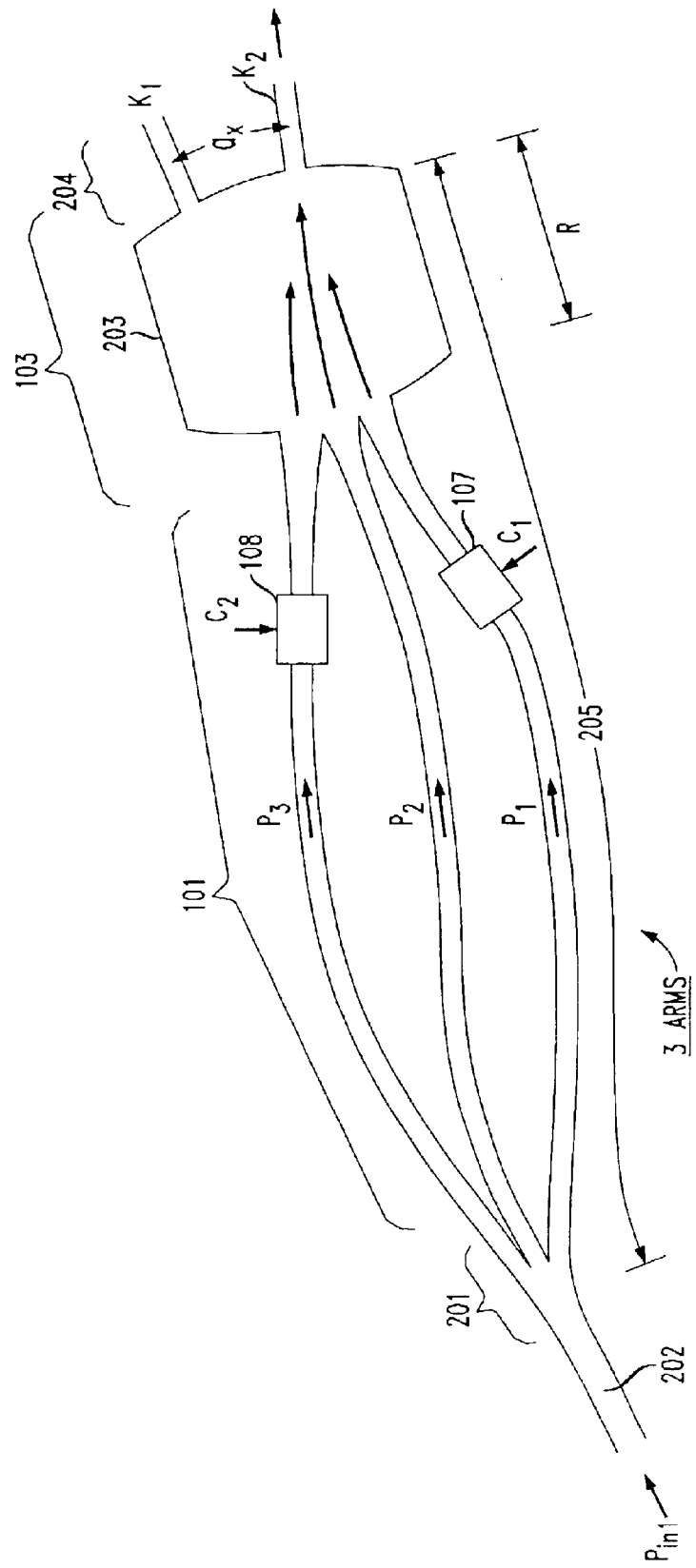
FIG. 2 shows another embodiment of my switching apparatus implemented as a 1×2 imaging arrangement of three arms combined with an input signal splitter and an output star coupler.

In accordance with one aspect of the invention, as shown in FIG. 2, the implementation of a 1×2 switching element may be simplified by replacing the first star coupler of the 2×2 switching element of FIG. 1 with a conventional 1×3 coupler or splitter 201. The following discussions about the FIG. 2 arrangement also apply to the arrangement of FIG. 1. In either case, an input signal Pin1, received over input waveguide 202, is split into three components, P1, P2, and P3 and transferred to the arms 101 of the arrangement. The three components are radiated by the three arms 101 into star coupler 103 having a free-space region formed by a slab 203 connected to two output waveguides k1, k2. Maximum power transfer to either output waveguide k1 or k2 is obtained by properly choosing the lengths of the arms 101, so as to cause the three components P1,P2,P3 to combine in phase at the desired waveguide k1 or k2. This requires that the three optical paths of the three components P1,P2,P3 have the same length (or signal phase delay). As a result, the three components P1,P2,P3 produce at the output waveguide k1 or k2 an image of the input waveguide signal Pin1, and efficient power transfer to the output waveguide is obtained. By including suitable wavelength adjusters in at least two of the three arms 101 the three optical paths of the three components P1,P2,P3 can be made to have the same length (or signal phase delay). As shown illustratively, in FIGS. 1 and 2, two wavelength adjusters 107 and 108 are operable in response to control signals C1 and C2, respectively, to adjust the optical path length (or optical signal phase) of the respective arms for P1 and P3 to be the same as arm P2.

For example in FIG. 2, one set of predetermined control signals C1 and C2 would cause the input signal Pin1 to be switched to the output waveguide k1, with minimal crosstalk levels of signal Pin1 at the other output waveguide k2. Similarly, using a second set of predetermined control signals C1 and C2 would cause the input signal Pin1 to be switched to the output waveguide k2, with minimal crosstalk levels of signal Pin1 at the other output waveguide k1. Thus, by using suitable predetermined control signals C1 and C2, efficient power transfer of the input waveguide signal Pin1 can be switched to either one of the two output waveguides k1,k2 with minimal crosstalk at the other output waveguide k2,k1, respectively.

If the switching apparatus is a 2×2 switching element, as shown in FIG. 1, then one suitable set of predetermined control signals C1 and C2, would, for example, switch an input signal Pin1 at a first input i1 to a first output waveguide k1, while a second input signal Pin2 at a second input i2 is switched to a second output waveguide k2. Additionally, a minimal crosstalk level of signal Pin2 would appear at first output waveguide k1 and a minimal crosstalk level of signal Pin1 would appear at second output waveguide k2. Similarly, when a second set of predetermined control signals C1 and C2 is applied to the 2×2 switching element, the input signal Pin1 is switched to the second output waveguide k2, while the second input signal Pin2 is switched to the first output waveguide k1. Again, minimal crosstalk level of signal Pin2 would appear at second output waveguide k1 and a minimal crosstalk level of signal Pin1 would appear at first output waveguide k1.

In both the FIG. 1 and FIG. 2 switching apparatuses, the predetermined control signals C1 and C2 necessary to accomplish the above-described switching functions would be provided by an associated switching control circuit, not shown.

Ideally, as discussed, one would like the switching elements of FIG. 1 and FIG. 2 to realize maximum transmission to one waveguide, e.g., k1, while transmitting negligible power to the other waveguide, i.e., k2. I have found that the optimum arrangement satisfying this condition is obtained when 1) the power P2 in the central arm is approximately twice the power in the other arms P1,P3 and 2) the spacing $a_x$ of the output waveguides is properly chosen as specified by condition in equation (4).

So far the above considerations apply to both arrangements of FIGS. 1, 2. The only difference, between the two arrangements, is that the 2×2 switch of FIG. 1 must simultaneously produce two images, respectively corresponding to the signals Pin1 and Pin2 received at the two input waveguides i1 and i2, respectively. In order to switch from the bar state (through transmission) to the cross state (interchanged transmission), and vice-versa, the 2×2 switch must interchange the two images Pin1 and Pin2. This requires the use of periodic arrays, e.g., 104,105,115,114, as shown later, and the desired behavior is again obtained by simply satisfying the above two conditions. The only difference is that in FIG. 1 the second condition must be satisfied, not only by the spacing $a_x$ of the output waveguides k1,k2, but also the spacing of the input waveguides i1,i2. The appropriate output spacing $a_x$ will be shown to have the following meaning. It is the spacing required to insure in FIG. 2 negligible crosstalk transmission to either output waveguide, k1 or k2, whenever maximum transmission is produced to the other output waveguide, k2 or k1, respectively, and the same result is obtained for either input signal Pin1, Pin2 of FIG. 1. In the following discussion of FIG. 1, I assume that wavelength adjusters 107 and 108 are included in the arms to realize three paths of equal length. In order to realize this condition with minimal adjustments, the arrangement should be implemented using the technique described in [3], or a similar technique. I assume also that the efficiency of the various arrays is optimized as described in [2,4]. Similar techniques may be used in FIG. 2.

The arrangement of FIG. 1 consists of two input waveguides (ports) i1,i2, two output waveguides (ports), k1,k2, two identical couplers 102,103 formed by two dielectric slabs and an imaging arrangement of three waveguides arms 101 connected to the two slabs. Each coupler 102,103 consists of two arrays of radial waveguides, e.g., 104,105, connected to a slab, e.g., 106, and it is characterized by two foci, F1,F2, determined by the phase centers of the two arrays 104,105, respectively. As in [2,4] the waveguides of each array are strongly coupled to maximize the array efficiency and, as a consequence, the two foci F1,F4, are displaced from the boundaries of the slab. Notice the waveguides of each array are directed towards the phase center of the other array (e.g., array 105 to F1 and 104 to F2). The distance between the two foci is R and, in the vicinity of each focal point, F1,F2, the waveguides are spaced by $a_x, a_w$, respectively. Also notice that each array 104,105 includes dummy waveguides, e.g., 109. For instance the input array 104 consists of four waveguides, but only two are used as input ports i1,i2. The dummy waveguides 109 are only needed to improve the transmission characteristics and insure identical radiation characteristics from the two input ports i1,i2. Notice FIG. 1 is a symmetric arrangement with both couplers 102,103 characterized by the same parameters $a_x, a_w, R$, but the following considerations also apply without this restriction. In the general case, simply assume different parameters $a_x', a_w', R', w'$ and $a_x, a_w, R, w$ for the input and output couplers. Then the following expressions obtained for the output coupler 103, also apply to the input coupler 102, with $a_x, a_w, R, w$ replaced by $a_x', a_w', R', w'$. In the following discussion, however, I consider the symmetric imaging arrangement of FIG. 1, characterized by unit magnification, giving $a_x, a_w, R, w = a_x', a_w', R', w'$.

Figure 3A:
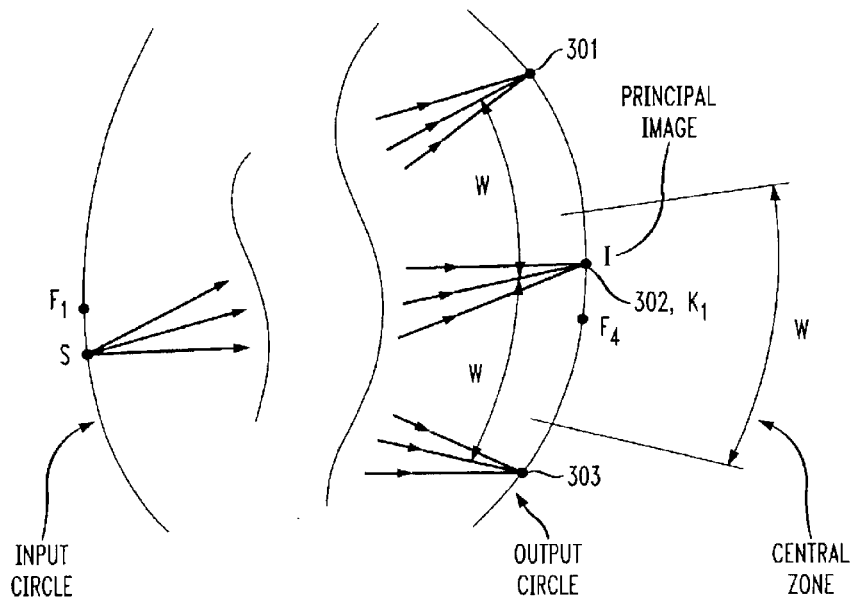
FIG. 3A shows an input waveguide signal to FIG. 1 viewed as a virtual point source S that is transformed by the arrangement of FIG. 1 into a set of equally spaced output images, spaced by w.

As discussed in [2], the input signal applied to a particular input waveguide is transformed by the arrangement into a set of output images equally spaced by on the output circle through $F_4$, as shown in FIG. 3a, with spacing $$w = \frac{R\lambda}{na_w} \quad (1)$$

where n is the effective refractive index. Here I assume efficient arrays and, therefore, the input power Pin2 in FIG. 1, shown as S in FIG. 3a, is primarily transferred to the principal image I closest to the axis formed by F3, F4. This image I is produced within an interval, called the central zone, whose width w is given by the above expression.

I denote by $l_3, l_2, l_1$ the optical lengths of the three arms in FIG. 1 and include in the top and bottom arms suitable wavelength adjusters 107,108 to control the lengths $l_3, l_1$. Notice that only the relative values of these lengths $l_3, l_1$ are important. Here I wish to produce to a good approximation a constant difference $$l = l_3 - l_2 = l_2 - l_1 \quad (2)$$

The cross state is obtained when the input signals for i1,i2 are respectively transferred to the output waveguides for k2,k1. Because of the arrangement symmetry, this condition simply requires $$l=0$$

in which case the arms have the same length and the principal images from the input waveguides i1,i2 are produced respectively at the output locations k2,k1. On the other hand, in order to produce the bar state, the locations of the two primary images must be interchanged, and this can be shown to require the condition $$w = 2a_x \quad (3)$$

Figure 3B:
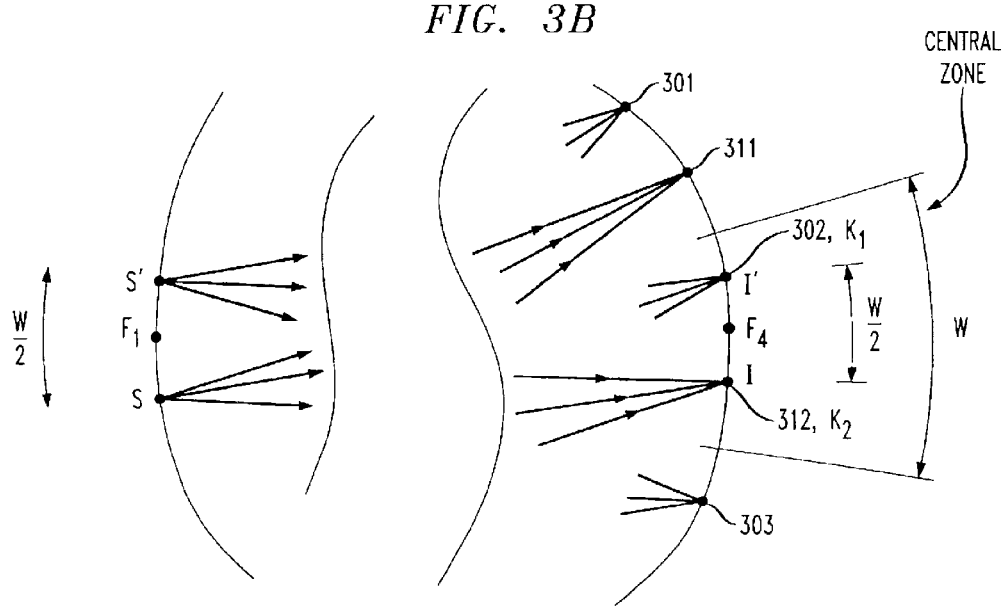
FIG. 3B shows the two input waveguides to FIG. 1 viewed as two virtual point sources S and S' whose signals are transformed by the arrangement of FIG. 1 into two interleaved sets of equally spaced output images, having a spacing of w/2 between output images.

This condition can be derived as follows. Each input waveguide, e.g., i2 in FIG. 1, can be viewed, as shown in FIG. 3b, as a virtual point source S respectively, located on the input circle through the phase center of the first array. Radiation from this point source S is transformed by the arrangement into a set of equally spaced virtual images 301–303 located as shown in FIG. 3a on the output circle through the phase center $F_4$ of the output array. These images are produced in FIG. 1 by the imaging array with focal point $F_4$. As shown in FIG. 3A, the output images 301–303 are equally spaced with spacing equal to the central zone width w. The value of w is determined by the periodicity [Equation (1)] of the imaging array. The intensities of the various images 301–303 are determined by the array element pattern, which for an efficient array is approximately a rectangular function of width w. The image 302 of greatest intensity in FIG. 3A is therefore the principal image I produced inside the central zone and, typically, all other (secondary) images 301,303 have much lower intensity.

FIG. 3b shows the output images 311,312 and 301–303 produced by the two input signals S and S', respectively, when the switch arrangement is in the cross state, obtained by choosing l=0. By choosing instead l=λ/2, one can show that all images are shifted by w/2. As a consequence, if condition (3) is satisfied, the two sets of output images 311,312 and 301–303 produced by the two input signals S and S' are interchanged, and the bar state is obtained. In fact, then the principal image I originally produced by the cross state at the output location k2 is shifted to k1. At the same time, the other principal image I' moves from output location k1 to the location 311, outside of the central zone, thus becoming a secondary image, and it is replaced by a new principal image I' (of different order) which moved from location 303, outside of central zone, to location k2 inside the central zone.

Notice that according to Eq. (1) the width w of the central zone is a function of the wavelength $\lambda$, and therefore the above conditions can only be satisfied at a particular design wavelength $\lambda_0$. At that wavelength, in order to obtain $w=2a_x$, one must choose according to Eq. (1)

$$R = 2na_x a_w / \lambda_0 \qquad (4)$$

We next derive the transmission coefficients under the above conditions.

The transmission coefficient $T_{i,k}$ from input waveguide i to output waveguide k consists of three components, each contributed by a particular arm. We denote by $P_1$, $P_2$, $P_3$ the powers transferred to the arms 101 when unit power is applied to either input waveguide i1 or i2. Then $$T_{i,k} = \sum_{j=1}^{j=3} P_j \exp(j\gamma_j) \qquad (5)$$

where the phase $\gamma_j = 2\pi L_j/\lambda$ is determined by the total optical path length $L_j$ traveled by the j-th signal component. Notice $L_j$ includes in addition to $l_j$ the contributions from the input and output couplers. The latter contributions depend on the locations of the input and output waveguides specified by i,k whereas the contribution $l_j$ depends on l, which must assume different values $l \equiv 0, \lambda_0/2$ in order to produce the two states (cross, bar) of the arrangement. To a good approximation, neglecting fabrication errors, $$P_3 = P_1,$$

$$\gamma_3 - \gamma_2 = \gamma_2 - \gamma_1 = \beta_{i,k}$$

and therefore letting $$\xi = 2\frac{P_1}{P_2} \qquad (6)$$

one obtains from Eq. (5)

$$T_{i,k} = T_0 \frac{1 + \xi \cos(\beta_{i,k})}{1 + \xi} \qquad (7)$$

where $$T_0 = (P_1 + P_2 + P_3) \exp(j\gamma_2)$$

$$\beta_{i,k} = 2\pi L_{i,k}/\lambda, \qquad (8)$$

with $$L_{i,k} = L_3 - L_2 = L_2 - L_1$$

In this expression the values of $L_3, L_2, L_1$ can be determined as in [2], and one finds that $$L_{1,2} = L_{2,1} = l \qquad (9)$$

$$L_{2,2} - L_{2,1} = L_{1,2} - L_{1,1} = \frac{na_x a_w}{R} \qquad (10)$$

Notice that each state is characterized by four transmission coefficients $T_{i,k}$. Two of these must be maximized, whereas the remaining two must be minimized. For instance, for the cross state, one must maximize $T_{1,2}, T_{2,1}$ and minimize $T_{1,1}, T_{2,2}$. As discussed earlier, a property of the arrangement of FIG. 1, because of its symmetry, is that both coefficients $T_{1,2}, T_{2,1}$ are maximized by simply choosing l=0, which from Eqs. (8,9) causes $\beta=0$ for both coefficients. Because of condition (4), the same result is obtained to a good approximation for the bar state, by choosing in this case $l=\lambda_0/2$ which in this case causes $\beta=0$ for both $T_{1,1}, T_{2,2}$ as one can verify from Eq. (10). To summarize, both the cross and bar states are characterized by maximum power transfer, with coefficient $T_0$, from each input port i1,i2 to the appropriate output port k1,k2. The arrangement efficiency is determined by the value of $T_0$, and it can be shown to be close to unity using efficient couplers.

Next consider the two crosstalk coefficients, that is, $T_{1,1}, T_{2,2}$ for the cross state and $T_{1,2}, T_{2,1}$ for the bar state. In this case, from Eqs. (9,10) the two crosstalk coefficients are characterized by $L_{i,k} = \lambda_0/2$ because of condition (4), and therefore $$\beta_{i,k} \simeq \pi \frac{\lambda_0}{\lambda} \qquad (11)$$

for both coefficients. It is generally desirable to choose $\xi$ slightly greater than unity, so as to obtain from Eq. (7) two zeros, 401,402 in the vicinity of the design wavelength $\lambda_0$ as illustrated by curve 403 of FIG. 4. Notice the two zeros coalesce at $\lambda_0$ if $\xi=1$, curve 404 of FIG. 4, in which case approximately $$T \simeq -\frac{T_0}{4}\left[\frac{\lambda - \lambda_0}{\lambda_0}\right]^2 \qquad (12)$$

A slightly larger value of $\xi$ is however desirable for two reasons. One reason is that one would like in general to obtain satisfactory crosstalk performance over the widest possible wavelength interval. If then $|T_m|$ is the maximum value of $|T_{i,k}|$ that can be tolerated, by requiring $$|T_{i,k}|^2 \leq |T_m|^2 \qquad (13)$$

one finds that the optimum value of $\xi$ that maximizes $|\lambda - \lambda_0|$ under this constraint is $$\xi = 1 + \left|\frac{T_m}{T_0}\right|^2. \qquad (14)$$

A second reason for which it is desirable that $\xi > 1$ is that fabrication errors may cause $P_1$ to be slightly different from $P_3$. Then it is still possible to produce zero transmission, by properly choosing slightly different values of $l_3 - l_2$, $l_2 - l_1$, provided $\xi > 1$. Notice from Eqs. (7,13,14) by specifying for instance −40 dB of maximum crosstalk one obtains $$2(\lambda - \lambda_0) < \frac{\lambda_0}{40}$$

giving for instance a wavelength range of 39 nm for $\lambda_0 = 1550$ nm.

Figure 4:
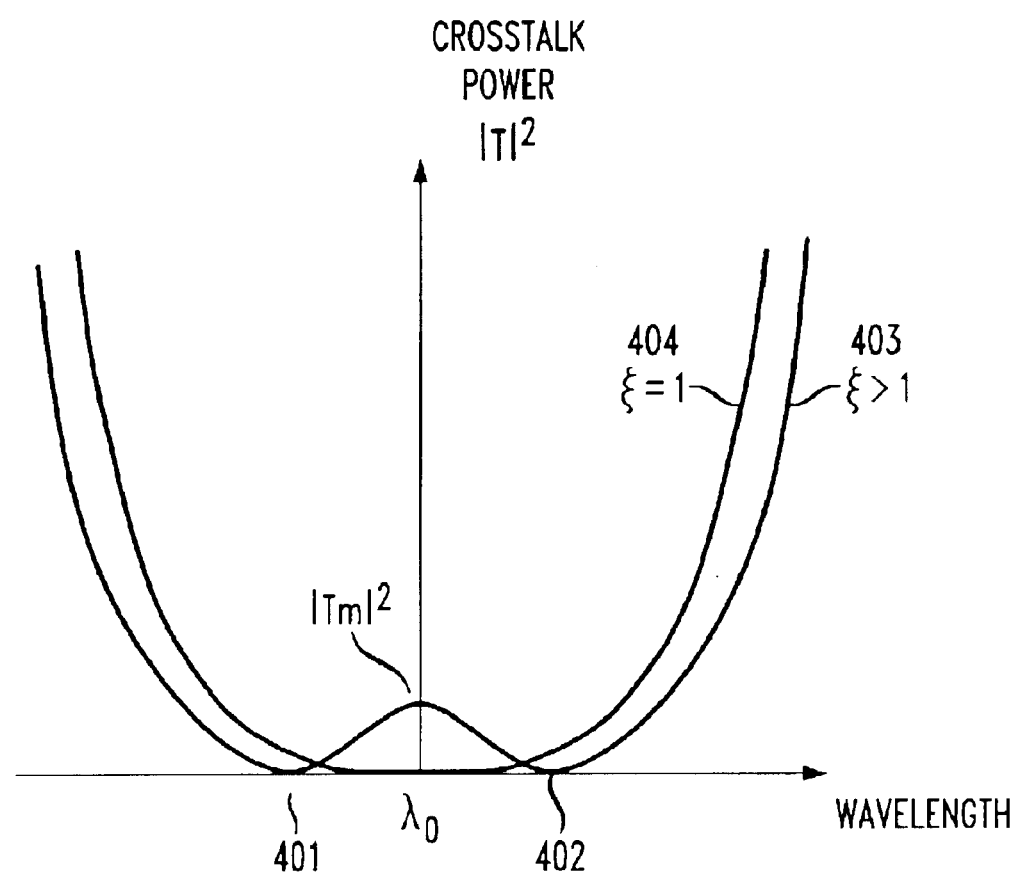
FIG. 4 shows illustrative curves of crosstalk power level variation with wavelength for $\xi \geq 1$.

Ideally, it is generally desirable produce, for the crosstalk transmission coefficient, two separate transmission zeroes, so as to maximize the stopband width, and obtain equi-ripple behavior as in FIG. 4. However, two perfect zeroes cannot be realized in practice, since this would require perfect control of the lengths of the three arms. Therefore, instead of two perfect transmission zeroes, two minima in transmission crosstalk will be realized in practice. The resulting stopband width will nevertheless be close to the maximum value, provided the two minima are characterized by negligible crosstalk power. Similarly, if maximally flat behavior is desired, one will obtain, instead of a double zero at the center of the stopband, a minimum characterized in its vicinity by maximally flat behavior, i.e. zero curvature to a good approximation.

Figure 5A:
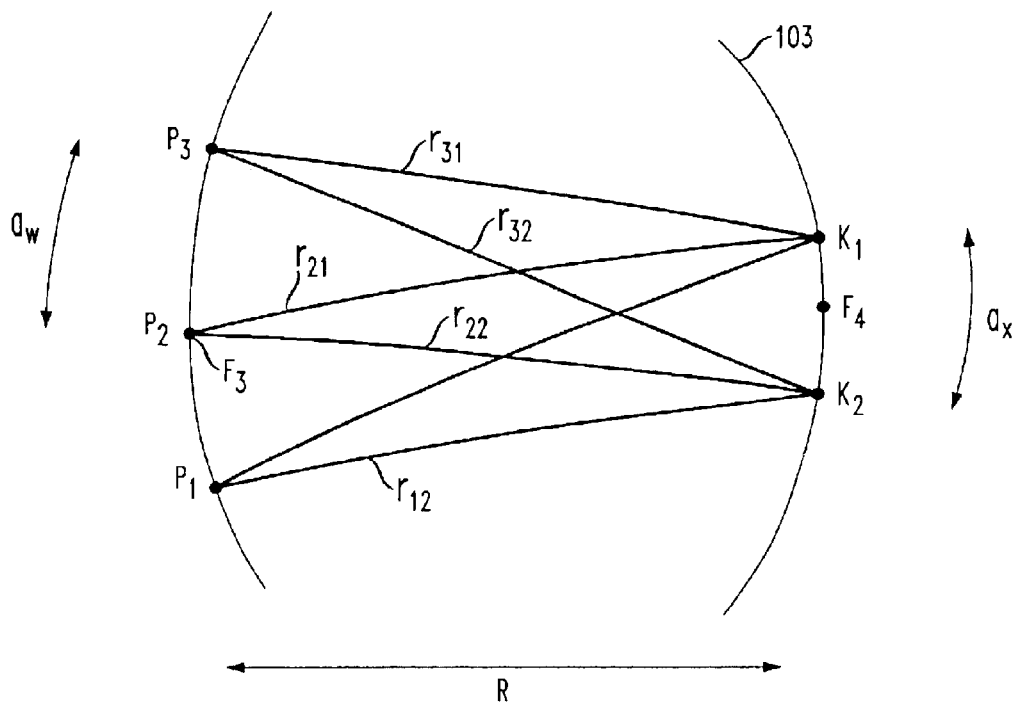
FIGS. 5A and B show the contributions $r_{3,1}, r_{2,1}, r_{3,2}, r_{2,2}$ at the output coupler of FIG. 1 to the output waveguides k1 and k2.
Figure 5B:
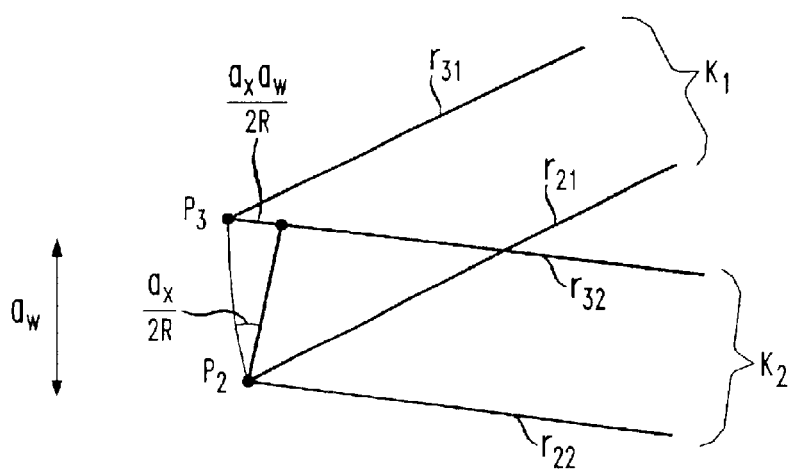

I have shown that the arrangement of FIG. 1 has the following properties. First, the cross state is simply characterized by l=0. Second, the two images can be interchanged, by letting l=$\lambda_0$/2, provided that condition (4) is satisfied. Third, two zero levels of crosstalk (401,402 of FIG. 4) are produced by the crosstalk coefficients provided condition (4) is satisfied. The last two results directly follow from Eq. (10), which can be derived as follows. Consider FIG. 5A, (showing the coupler 103 of FIG. 1) with two circles through the two foci $F_3$,$F_4$, and the locations of the various arms P1–P3 and output waveguides k1, k2 on these two circles. From FIG. 5B one obtains $$L_{i,2} - L_{i,1} = n[r_{3,2} - r_{3,1} - (r_{2,2} - r_{2,1})] = \frac{n a_x a_w}{R} = \frac{\lambda_0}{2},$$

where the last result follows from condition (4) and the path lengths r are shown in FIG. 5A. The above result implies that condition (4) is needed to insure condition (11) for the crosstalk coefficients. Since condition (11) is needed in order to obtain the behavior of FIG. 4, I conclude that it must be satisfied, to a good approximation, in order to produce two crosstalk zeros (401,402 of FIG. 4) in the vicinity of $\lambda_0$.

With reference to FIG. 1, so far we assumed that each coupler 102, 103 is made up of arrays of equally spaced waveguides. In practice, this condition need not be satisfied exactly. In particular, since the value of $\xi$ is determined by the radial arrays 105, 115 connected to the arms 101, the spacing of these arrays $a_w$ may have to be slightly modified in order to realize the appropriate value of $\xi$.

Figure 6:
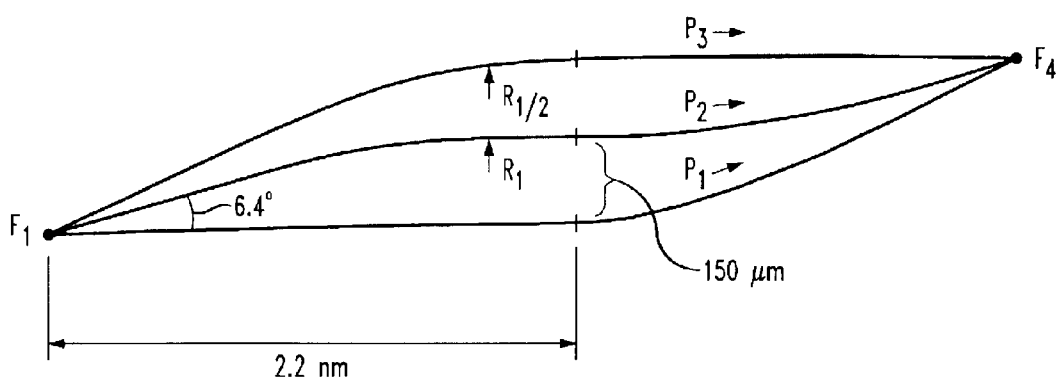
FIG. 6 shows an example of 3 paths having approximately the same optical length.

We have seen that the arms 101 must have the same length in order to produce the cross state. FIG. 6 shows the length of the three optical paths, including the arms 101, from foci F1 to F4 of FIG. 1. For the diagram of FIG. 6, there is shown the illustrative parameters utilized to implement for the arms, with $R_1$ denoting the radius of curvature, $n_0$ being the refractive index of glass, and a=$a_x$=$a_w$. Note however, that in the diagram of FIG. 6 one finds that the central arm P2 is slightly shorter then the top P3 and bottom P1 arms. The difference in arm length $\delta$l is small (for instance, about 3.2 $\mu$m in the example of FIG. 6) and its effect can be removed by increasing the width of the central waveguide. Also notice that a small residual $\delta$l can be compensated by the wavelength adjusters (107,108 of FIG. 1) in an arm, for instance by using the Electro-Optic effect for controlling the effective length of the arm (i.e., the phase of the signal in the arm).

Advantages of my above-described switching arrangement are that it is compact, polarization insensitive, broadband and insensitive to fabrication errors. A disadvantage is its loss, which is expected to be less than one dB.

Figure 7A:
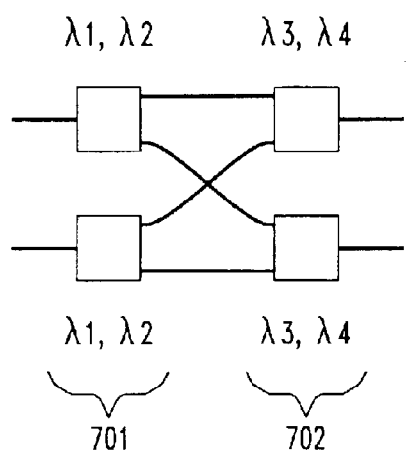
FIG. 7A shows a dilated 2×2 crossbar switch arrangement consisting of two 1×2 input switches and two 2×1 switches, each implemented using my switching apparatus.
Figure 7B:
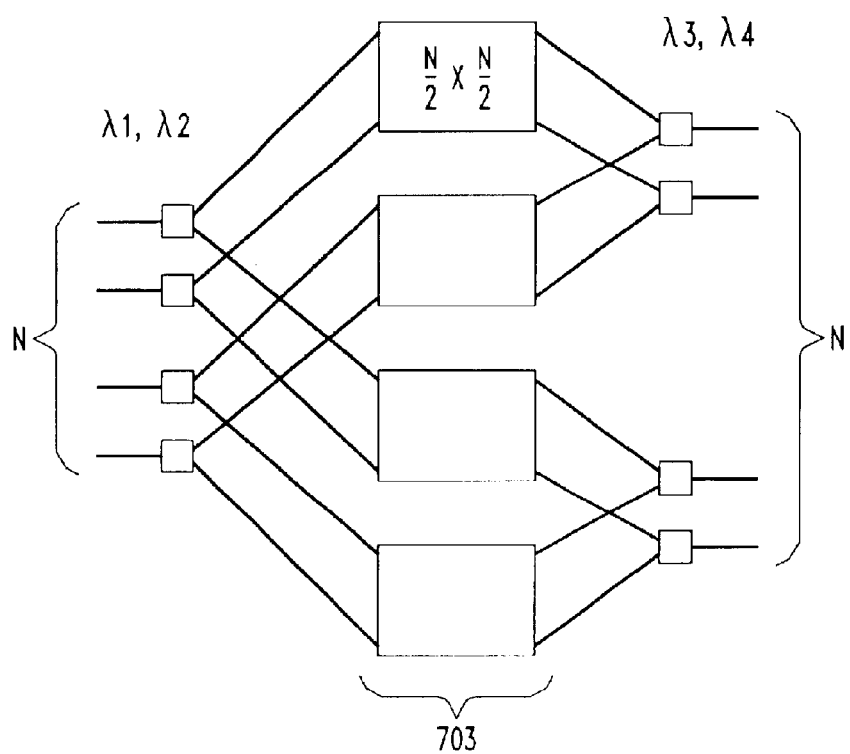
FIG. 7B shows a dilated 4×4 crossbar switch arrangement implemented using my switching apparatus.
Figure 7C:
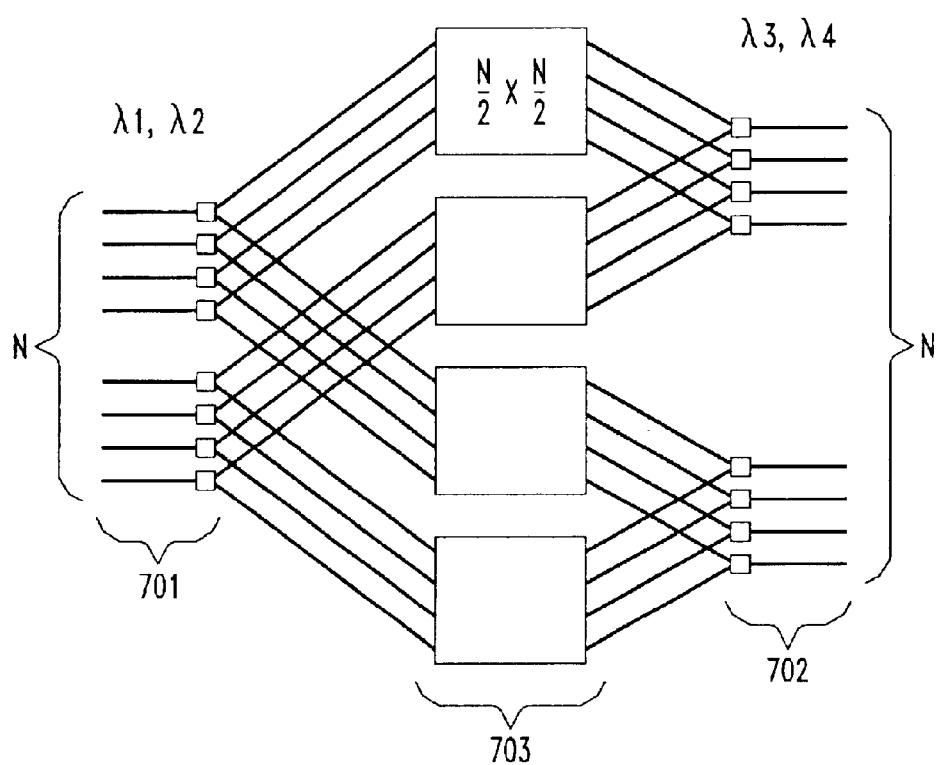
FIG. 7C shows a dilated 8×8 crossbar switch arrangement implemented using my switching apparatus.
Figure 7D:
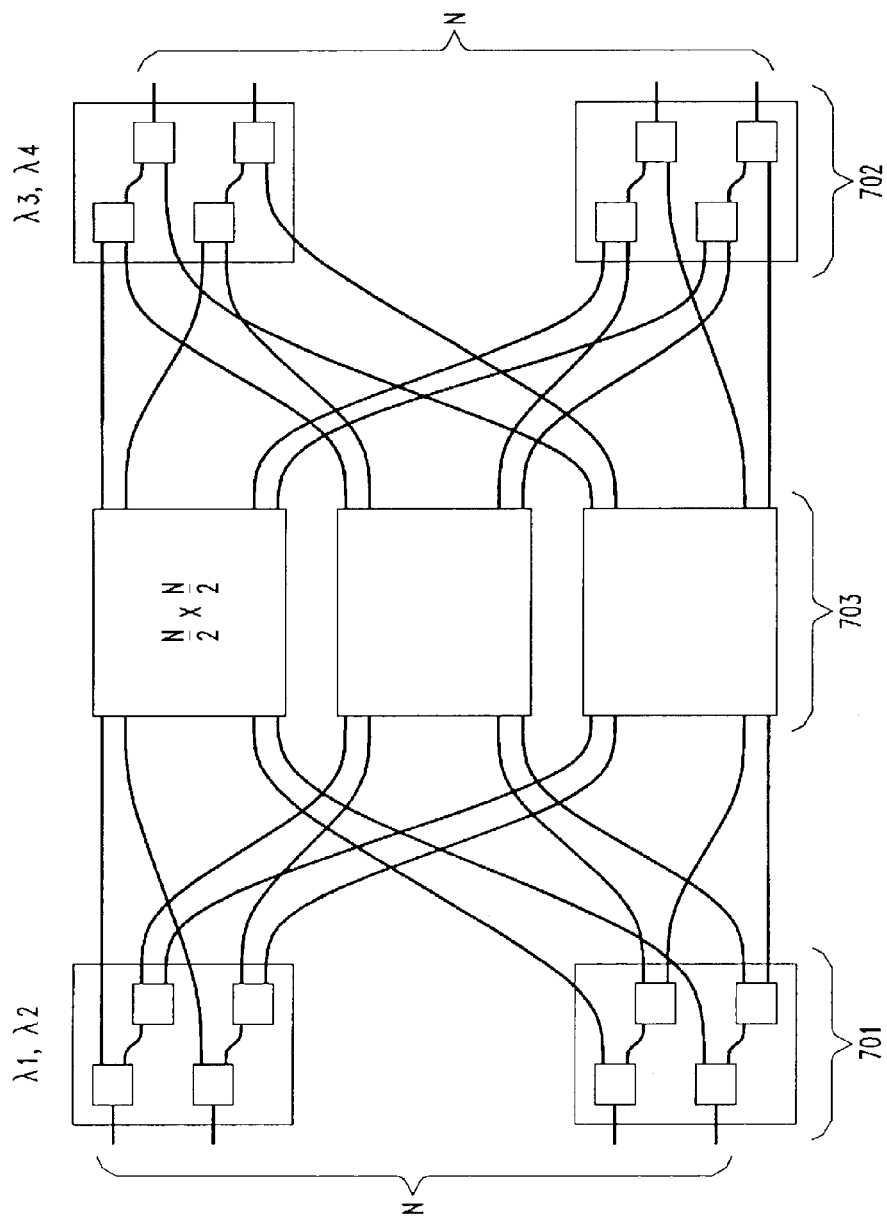
FIG. 7D shows a dilated N×N Clos switch arrangement implemented using my switching apparatus.

As an application of the above technique, FIGS. 7A–7C show various dilated N×N arrangements that can be implemented using 1×2 and 2×1 switching elements. FIG. 7A illustrates a dilated 2×2 crossbar switch, FIGS. 7B,C illustrate dilated N×N crossbar switches, where N=4,8, and FIG. 7D illustrates a dilated N×N Clos switch.

Figure 7E:
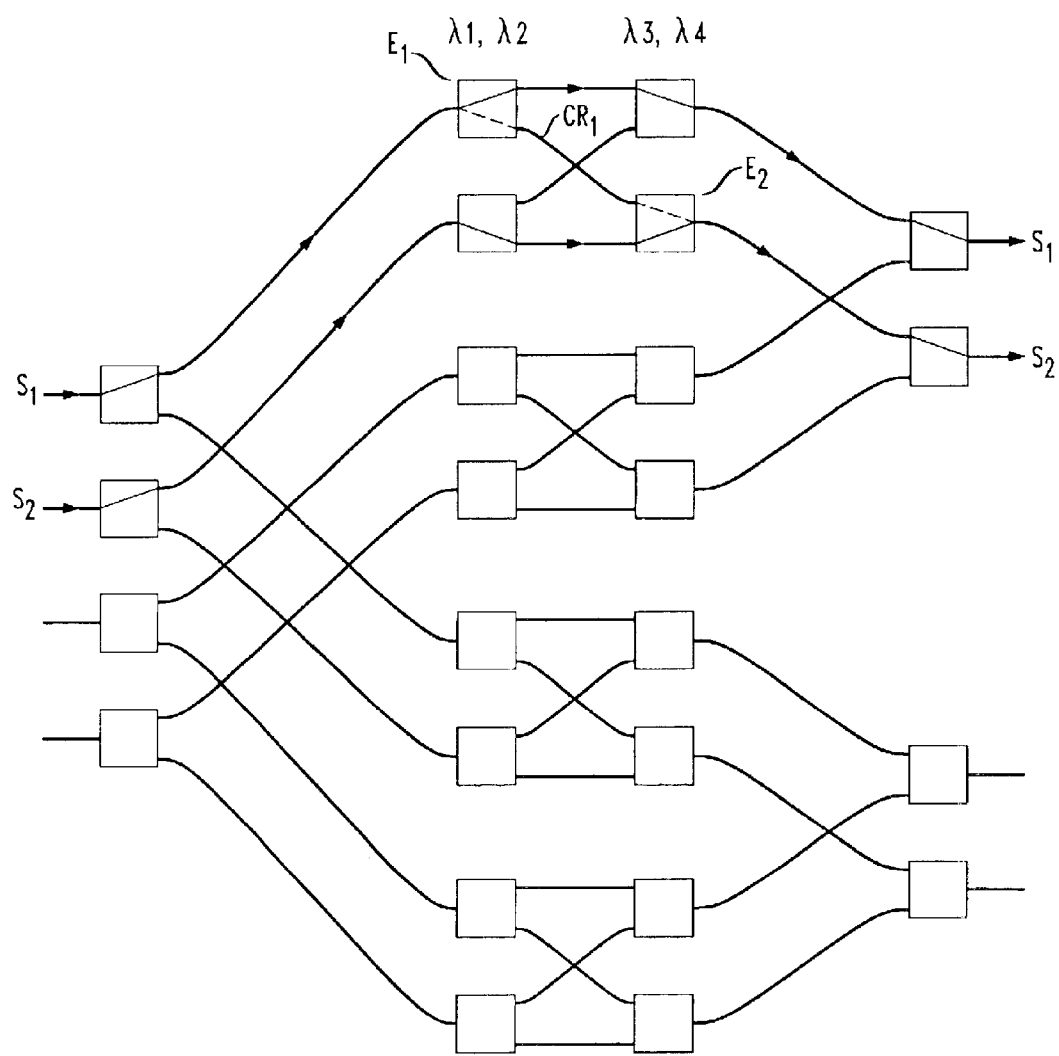
FIG. 7E shows a crosstalk path, through the arrangement of FIG. 7B, between two active paths traversed by signals $S_1$ and $S_2$.
Figure 8:
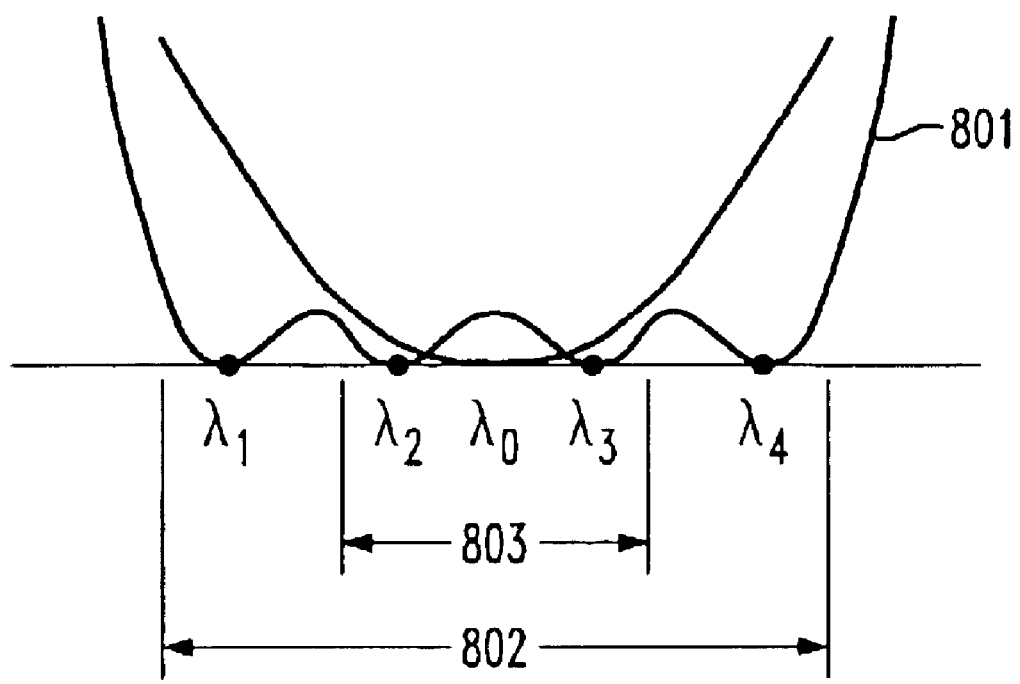
FIG. 8 shows illustrative curves of how crosstalk power varies with wavelength for a dilated switching arrangement characterized by a crosstalk stopband with 4 zeros.

These crossbar and Clos switches may be implemented as described in U.S. Pat. No. 6,456,752, Ser. No. 09/687,346, Issued on Sep. 24, 2002, entitled "Large N×N Optical Switch Using Binary Trees," which is incorporated by reference herein. In these arrangements each switching configuration is determined by the control signals applied to the various switching elements, which establishes a set of paths between the inputs and outputs of the arrangement. A property of a dilated arrangement is that a suitable control algorithm will cause each switching element of the arrangement to be traversed by only one intended signal. Each switching configuration of the arrangement will then produce to a good approximation a set of disjointed active paths (no common elements), each traversed by a particular input signal. However, crosstalk paths will also be produced as illustrated in FIG. 7E, showing schematically the arrangement of FIG. 7B with two active paths, traversed respectively by signals $S_1$ and $S_2$, and a crosstalk path CR1 causing some leakage of signal $S_1$ to the path of $S_2$. The crosstalk path goes from a particular element $E_1$ located on the first path to an element $E_2$ on the second path. Both elements block transmission through the crosstalk path. Therefore, by using the technique described herein a total of (at least) 4 zeros may be established for the resulting crosstalk transmission coefficient in FIG. 7E. Two of these zeros are contributed by the first blocking element $E_1$ and the other two zeros are contributed by the second blocking element $E_2$. Therefore four equally spaced zeros for wavelengths $\lambda_1,\lambda_2,\lambda_3,\lambda_4$ can be realized by producing for instance the first two zeros $\lambda_1, \lambda_2$ with the first blocking element and, the last two $\lambda_3, \lambda_4$, with the second element stage. If desired, the zeros of the first element can be $\lambda_1, \lambda_3$ and the zeros of the second element $\lambda_2, \lambda_4$. As shown in FIG. 8, one thus obtains crosstalk transmission coefficients with equi-ripple behavior in the stopband 801 and one can show that this technique maximizes the stopband width 802, which is then approximately twice the stopband width 803 obtained when the four zeros are selected to coincide at a single wavelength $\lambda_0$. Notice the crosstalk transfer function, from a particular input port to a particular output port, is defined here, at a particular wavelength, as the output power transferred to the output port with unity input power applied at that wavelength. Neglecting losses, the transfer function for a particular crosstalk path is approximately the product of the individual transfer functions of the blocking elements in that crosstalk path.

The above considerations apply in general to any dilated arrangement and, in particular to the arrangements of FIGS. 7A–D. Each of these arrangements includes a first 701 and last 702 stage and, by using the technique described herein a total of (at least) 4 zeros may be established for each crosstalk transmission coefficient with end elements $E_1,E_2$ respectively located in these two stages. In FIG. 7A, for instance, two of these zeros are contributed by the first stage 701 and the other two zeros are contributed by the last stage 702. The same technique applies in FIGS. 7B–D to the crosstalk paths with blocking elements $E_1,E_2$ located in the first and last stage. The technique also applies to the remaining crosstalk paths, those with $E_1,E_2$ located in the central stage. For instance, in FIG. 7B, each block in the central stage can be realized as in FIG. 7A. Similarly, each central block in FIG. 7C can be realized as in FIG. 7B. More generally the above technique can be applied recursively to realize any crossbar arrangement with N equal to any power of 2, and essentially the same procedure also applies to Clos arrangement of FIG. 7D. The main difference in this arrangement is that each block in the input and output stages now includes several elements. In all cases, all crosstalk paths can be made to have four zeroes. Thus using my crosstalk reduction technique results in a dilated N×N broadband switch (FIGS. 7A–7C) with negligible crosstalk over very wide wavelength stopband characterized by 4 equally spaced zeros. The very wide crosstalk stopband enables the N×N broadband switch to switch a broadband wavelength division multiplexed input signal to one output port with very low crosstalk at the other output ports.

Notice, if desired, the FIGS. 7A–D switch arrangements may be implemented using only one, two or three zeros. Also notice that depending on the implementation of the intermediate stages 703 of FIGS. 7C and D, it may be possible, for the crosstalk paths with blocking elements $E_1$, $E_2$ located in the first and last stage, to substantially reduce their crosstalk by further blocking these paths with additional elements located in the intermediate stages. Indeed, this is always possible for a dilated crossbar arrangement with $N \geq 8$ and, in this case, our technique need only be applied to the central stage. Alternatively, one may choose to add more zeroes to the crosstalk paths in question, thereby further increasing their stopbands. Similar considerations apply to the Clos arrangement.

APPENDIX

References

[1] C. Dragone, "Optimum Design of a Planar Array of Tapered Waveguides", J. Opt. Soc. Amer. A., vol. 7, no. 11, pp. 2081–2093, November 1990; also see U.S. Pat. No. 5,039,993, Issued on Aug. 13, 1991.

[2] C. Dragone, "An N×N Optical Multiplexer Using a Planar Arrangement of Two Star Couplers", IEEE Photon. Technol. Lett., vol. 3, pp. 812–815, September 1991; also see U.S. Pat. No. 5,136,671, Issued on Aug. 4, 1992.

[3] R. Adar, C. Dragone, and C. H. Henry, "Planar Lens and Low Order Array Multiplexer", U.S. Pat. No. 5,212,758, Issued May 18, 1993.

[4] C. Dragone, "Waveguide Array With Improved Efficiency for Wavelength Routers and Star Couplers in Integrated Optics", U.S. Pat. No. 6,058,233, Issued May 2, 2000.

What is claimed is:

1. A broadband optical switching apparatus comprising
an imaging arrangement including a first and second broadband couplers having only three imaging waveguide arms connected therebetween;
the first coupler including at least one input connected as an input waveguide of the switching apparatus for receiving a broadband optical signal and three outputs connected to the three imaging arms;
the second coupler is a star coupler consisting of a first and second radial array separated by a slab waveguide, the three imaging arms being connected to three central waveguides of the first radial array, and two central waveguides of the second radial array being connected to a first and a second output waveguides of the switching apparatus;
the three imaging arms including a top, a central, and a bottom imaging arm;
at least two of the three imaging arms including wavelength adjusters to control optical path lengths through the three arms, said adjusters adjusted to produce equal optical path lengths from the input waveguide to the first output waveguide thereby maximizing broadband optical signal power transfer from the input waveguide to the first output waveguide;
the spacing between the two central waveguides of the second radial array being selected so as to minimize power transfer to the second output waveguide; and
wherein the power transfer to the top, central, and bottom imaging arms is controlled so that the difference between the combined power transferred to the top and bottom imaging arm and the power transferred to the central imaging arm is controlled to have a ratio close to one so that the crosstalk at a center wavelength of the broadband optical signal does not exceed a predetermined value.

2. The optical switching apparatus of claim 1 wherein the combined power transferred to the top and the bottom imaging arm is smaller than the power transferred to the central imaging arm.

3. The optical switching apparatus of claim 1 wherein the predetermined maximum value is about zero.

4. The optical switching apparatus of claim 1 wherein the first coupler is a star coupler consisting of a first and second radial array separated by a slab waveguide, the at least one input waveguide of the switching apparatus being connected to a waveguide of the first radial array, and the three imaging arms being connected to three central waveguides of the second radial array.

5. The optical switching apparatus of claim 1 wherein the spacing between the three central waveguides of the first radial array is $a_w$, the spacing between the central waveguides of the second radial array is $a_x$, the distance between the two foci of the first and second arrays is R, the effective refractive index of the slab waveguide is n, $l_0$ is a specified design wavelength within the wavelength range of specified operation, and where $R=(2a_x a_w n)/l_0$.

6. The optical switching apparatus of claim 5 wherein the second radial array of the second coupler includes at least two additional waveguides that straddle the two central waveguides of the second radial array and are spaced $a_x$ therefrom.

7. The optical switching apparatus of claim 4
wherein the first coupler has the first radial array including two central waveguides connected to two input waveguides of the switching apparatus; and
wherein the spacing of the central waveguides of the first radial array of the first coupler connected to the two input waveguides is properly chosen so that whenever maximum power transfer is produced from either input waveguide to either output waveguide this will also produce efficient power transfer between the other two waveguides.

8. The optical switching apparatus of claim 7 wherein the first radial array of the first coupler includes at least two additional waveguides that straddle the two central waveguides of the first radial array and are spaced $a_x$ therefrom.

9. The optical switching apparatus of claim 1 where, for an optical input signal received at the input waveguide of the optical switching apparatus, said spacing between the two central waveguides of the second radial array is selected so as to maximize the stopband width determined by the wavelengths of the optical input signal for which the optical switching apparatus has a crosstalk transfer function that is less than a predetermined maximum value, said crosstalk transfer function being defined as the crosstalk power transferred at a particular wavelength to the second output waveguide when unit input power is applied to the input waveguide at that wavelength.

10. The optical switching apparatus of claim 9 wherein said crosstalk transfer function has a stopband characterized by a minimum point of essentially zero crosstalk.

11. The optical switching apparatus of claim 9 wherein said crosstalk transfer function has a stopband with two separate minima of essentially zero crosstalk.

12. The optical switching apparatus of claim 1 wherein the optical transmission is reversed, so that the two output waveguides become input waveguides and the arrangement is capable of connecting either input waveguide to an output waveguide.

13. The optical switching apparatus of claim 12 being part of a dilated switching arrangement connected to several input signals and several output ports, wherein each switching configuration of the dilated arrangement consists of separate active paths, each connecting a particular input signal to a particular output port, and wherein each crosstalk path between any two active paths is blocked by at least two switching apparatuses, each realized as in claim 12.

14. The optical switching apparatus of claim 12 being part of a dilated switching arrangement connected to several input signals and several output ports, wherein each switching configuration of the dilated arrangement consists of separate active paths, each connecting a particular input signal to a particular output port, and wherein each crosstalk path between any two active paths is blocked by at least two switching apparatuses, each realized as in claim 1.

15. The optical switching apparatus of claim 12 being connected as each of two 2×1 output switches of a 2×2 dilated crossbar arrangement having a first column of two optical switching apparatuses connected as 1×2 input switches and a second column of two of said optical switching apparatuses connected as 2×1 output switches, where each of two inputs of the 2×2 dilated crossbar arrangement is connected to an input of a different 1×2 input switch, where each of the two outputs of each 1×2 input switch connects to a different input of a different one of the 2×1 output switches, and each of two outputs of the 2×2 dilated crossbar arrangement is connected to an output of a 2×1 output switch.

16. The optical switching apparatus of claim 1 being connected as each of two 1×2 input switches of a 2×2 dilated crossbar arrangement having a first column of two of said optical switching apparatuses connected as 1×2 input switches and a second column of two optical switching apparatuses connected as 2×1 output switches where each of two inputs of the 2×2 dilated crossbar arrangement is connected to an input of a different 1×2 input switch, where each of the two outputs of each 1×2 input switch connects to a different input of a different one of the 2×1 output switches, and where each of two outputs of the 2×2 dilated crossbar arrangement is connected to an output of a different 2×1 output switch.

17. The optical switching apparatus of claim 16 wherein at least one crosstalk transfer function of said 2×2 dilated crossbar arrangement has two separate minima of negligible crosstalk.

18. The optical switching apparatus of claim 16 wherein said 2×2 dilated crossbar arrangement has a crosstalk transfer function that has four separate minima of negligible crosstalk.

19. The optical switching apparatus of claim 1 being connected as 1×2 input switches of a dilated crossbar arrangement including an input stage having a column of said optical switching apparatuses connected as 1×2 input switches, an intermediate stage, and an output stage having a column of 2×1 output switches, where each input of the dilated crossbar arrangement connects to an input to a different one of the 1×2 input switches, where each output of the dilated crossbar arrangement connects to an output of a different one of the 2×1 output switches, and where the intermediate stage includes a plurality of switches, which provide a connection between each of the outputs of the 1×2 input switches and inputs to the plurality of switches and which provide a connection between outputs of the plurality of switches and each of the inputs to the 2×1 input switches of the output stage.

20. The optical switching apparatus of claim 19 wherein said dilated crossbar arrangement has a crosstalk transfer function that has at least two separate minima of essentially zero crosstalk.

21. The optical switching apparatus of claim 12 being connected as 2×1 output switches of a dilated Clos switching arrangement including an input stage having a column of 1×2 input switches, an intermediate stage, and an output stage having a column of said optical switching apparatuses connected as 2×1 output switches, wherein each input of the Clos switching arrangement connects to an input of a different one of the 1×2 input switches;

where each output of the Clos switching arrangement connects to a different one of the 2×1 output switches; and wherein the intermediate stage includes a plurality of intermediate switches, which provide a connection between each of the outputs of the 1×2 input switches and inputs to the plurality of intermediate switches and which provide a connection between outputs of the plurality of intermediate switches and each of the inputs to the 2×1 input switches of the output stage.

22. The optical switching apparatus of claim 1 being connected as 1×2 input switches of a dilated Clos switching arrangement including an input stage having a column of said optical switching apparatuses connected as 1×2 input switches, an intermediate stage, and an output stage having a column of 2×1 output switches, wherein each input of the Clos switching arrangement connects to an input of a different one of the 1×2 input switches;

where each output of the Clos switching arrangement connects to a different one of the 2×1 output switches; and wherein the intermediate stage includes a plurality of intermediate switches, which provide a connection between each of the outputs of the 1×2 input switches and inputs to the plurality of intermediate switches and which provide a connection between outputs of the plurality of intermediate switches and each of the inputs to the 2×1 input switches of the output stage.

23. The optical switching apparatus of claim 22 wherein at least one crosstalk transfer function of said dilated Clos switching arrangement has at least two separate minima of negligible crosstalk.

24. The optical switching apparatus of claim 1 where in response to control signals to the at least two wavelength adjusters the optical switching apparatus switches to the first output waveguide an input signal received at a first input waveguide.

25. The optical switching apparatus of claim 24 where in response to said control signals to the at least two wavelength adjusters the optical switching apparatus switches to the second output waveguide an input signal received at a second input waveguide.

26. The optical switching apparatus of claim 1 wherein the at least one input receives a broadband wavelength division multiplexed signal which is switched to one of the outputs waveguides of the optical switching apparatus.

27. A method of a operating broadband optical switching apparatus comprising an imaging arrangement including a first and second broadband couplers having only three imaging waveguide arms connected therebetween;

the first coupler including at least one input connected as an input waveguide of the switching apparatus for receiving a broadband optical signal and three outputs connected to the three imaging arms;

the second coupler is a star coupler consisting of a first and second radial array separated by a slab waveguide, the three imaging arms being connected to three central waveguides of the first radial array, and two central waveguides of the second radial array being connected to a first and a second output waveguides of the switching apparatus; and the three imaging arms including a top, a central, and a bottom imaging arm;

the method comprising the steps of:

adjusting the phase of an optical signal in at least two of the three imaging arms to maximize broadband optical signal power transfer from the input waveguide to the first output waveguide; and wherein the power transfer to the top, central, and bottom imaging arms is controlled so that the difference between the combined power transferred to the top and bottom imaging arm and the power transferred to the central imaging arm is controlled to have a ratio close to one so that the crosstalk at a center wavelength of the broadband optical signal does not exceed a predetermined maximum value.

\* \* \* \* \*